US012563305B2

(12) United States Patent
Talagala et al.

(10) Patent No.: US 12,563,305 B2
(45) Date of Patent: Feb. 24, 2026

(54) METHOD, APPARATUS AND PROGRAM FOR ADJUSTING AN EXPOSURE LEVEL

(71) Applicant: Arm Limited, Cambridge (GB)

(72) Inventors: Dumidu Sanjaya Talagala, Coventry (GB); Alexis Leonardo Lluis Gomez, Chelford (GB); Matthew Adam Hellewell, Whaley Bridge (GB); Maxim Novikov, Manchester (GB)

(73) Assignee: Arm Limited, Cambridge (GB)

( * ) Notice: Subject to any disclaimer, the term of this patent is extended or adjusted under 35 U.S.C. 154(b) by 259 days.

(21) Appl. No.: 18/446,540

(22) Filed: Aug. 9, 2023

(65) Prior Publication Data

US 2024/0073539 A1 Feb. 29, 2024

Related U.S. Application Data

(63) Continuation of application No. 17/820,055, filed on Aug. 16, 2022, now Pat. No. 12,088,922.

(30) Foreign Application Priority Data

Aug. 16, 2022 (GB) ...................................... 2211961
Aug. 16, 2022 (GB) ...................................... 2211962

(51) Int. Cl.
*H04N 23/741* (2023.01)
*G06T 5/92* (2024.01)
(Continued)

(52) U.S. Cl.
CPC ............. *H04N 23/741* (2023.01); *G06T 5/92* (2024.01); *H04N 23/71* (2023.01); *H04N 23/73* (2023.01);
(Continued)

(58) Field of Classification Search
None
See application file for complete search history.

(56) References Cited

U.S. PATENT DOCUMENTS 6,421,079 B1 7/2002 Truc et al.
9,584,732 B2 2/2017 Romanenko
(Continued)

FOREIGN PATENT DOCUMENTS

CN 101729789 A * 6/2010 ........... H04N 23/741
CN 104917975 A 9/2015
(Continued)

OTHER PUBLICATIONS

English translation of CN-101729789-A, Yuma, 2010 (Year: 2010).*
(Continued)

*Primary Examiner* — James M Hannett
(74) *Attorney, Agent, or Firm* — EIP US LLP

(57) ABSTRACT

A method for adjusting an exposure level of an image sensor. The method comprises receiving intensity values of a current image captured by the image sensor, the image sensor having an initial exposure level when the current image is captured. The method comprises determining an intensity status based on comparing at least one characteristic of at least the current intensity values to one or more criteria. The method comprises selecting an exposure convergence mode, from a plurality of exposure convergence modes, based on the intensity status. The method comprises calculating, based on the current intensity values and the exposure convergence mode, a new exposure level for use by the image sensor in capturing a subsequent image.

13 Claims, 9 Drawing Sheets

Pre-tonemapped intensity values          Tonemapped intensity values

(51) Int. Cl.

| | |
|---|---|
| *H04N 23/71* | (2023.01) |
| *H04N 23/73* | (2023.01) |
| *H04N 23/76* | (2023.01) |

(52) U.S. Cl.
CPC ... *H04N 23/76* (2023.01); *G06T 2207/10144* (2013.01); *G06T 2207/20172* (2013.01); *G06T 2207/20208* (2013.01)

(56) References Cited

U.S. PATENT DOCUMENTS

| | | |
|---|---|---|
| 10,846,834 B2 | 11/2020 | Fleizach |
| 2010/0265342 A1 | 10/2010 | Liang et al. |
| 2011/0298886 A1 | 12/2011 | Price et al. |
| 2014/0176750 A1 | 6/2014 | Pajak et al. |
| 2015/0022687 A1 | 1/2015 | Galor |
| 2015/0379740 A1 | 12/2015 | Yang et al. |
| 2017/0034520 A1 | 2/2017 | Rosewarne |
| 2019/0311694 A1 | 10/2019 | Van Mourik et al. |
| 2019/0394379 A1 | 12/2019 | Segapelli et al. |
| 2021/0112188 A1 | 4/2021 | Gao et al. |

FOREIGN PATENT DOCUMENTS

| | | |
|---|---|---|
| CN | 103295194 B | 11/2015 |
| CN | 109785251 B | 2/2021 |
| CN | 112312036 A | 2/2021 |
| CN | 114666512 A | 6/2022 |
| GB | 2621820 A | 2/2024 |
| JP | 2004170900 A * | 6/2004 |
| WO | 2022012748 A1 | 1/2022 |

OTHER PUBLICATIONS

English translation of JP-2004170900-A, Tsai, 2004 (Year: 2004).*
Pourreza-Shahr et al: "Automatic exposure selection and fusion for high-dynamic-range photography via smartphones" May 9, 2017. https://www.researchgate.net/publication/340859603_Automatic_exposure_selection_and_fusion_for_high-dynamic-range_photography_via_smartphones.
Onzon et al: "Neural Auto Exposure for High-Dynamic Range Object Detection", Jul. 13, 1905. https://light.princeton.edu/publication/neural_auto_exposure/.
Bernacki, Jaroslaw: "Automatic exposure algorithms for digital photography", Jan. 22, 2022. https://doi.org/10.1007/s11042-019-08318-1.
Combined Search and Examination Report dated Jun. 9, 2025 for GB Application No. GB2418378.2.

* cited by examiner

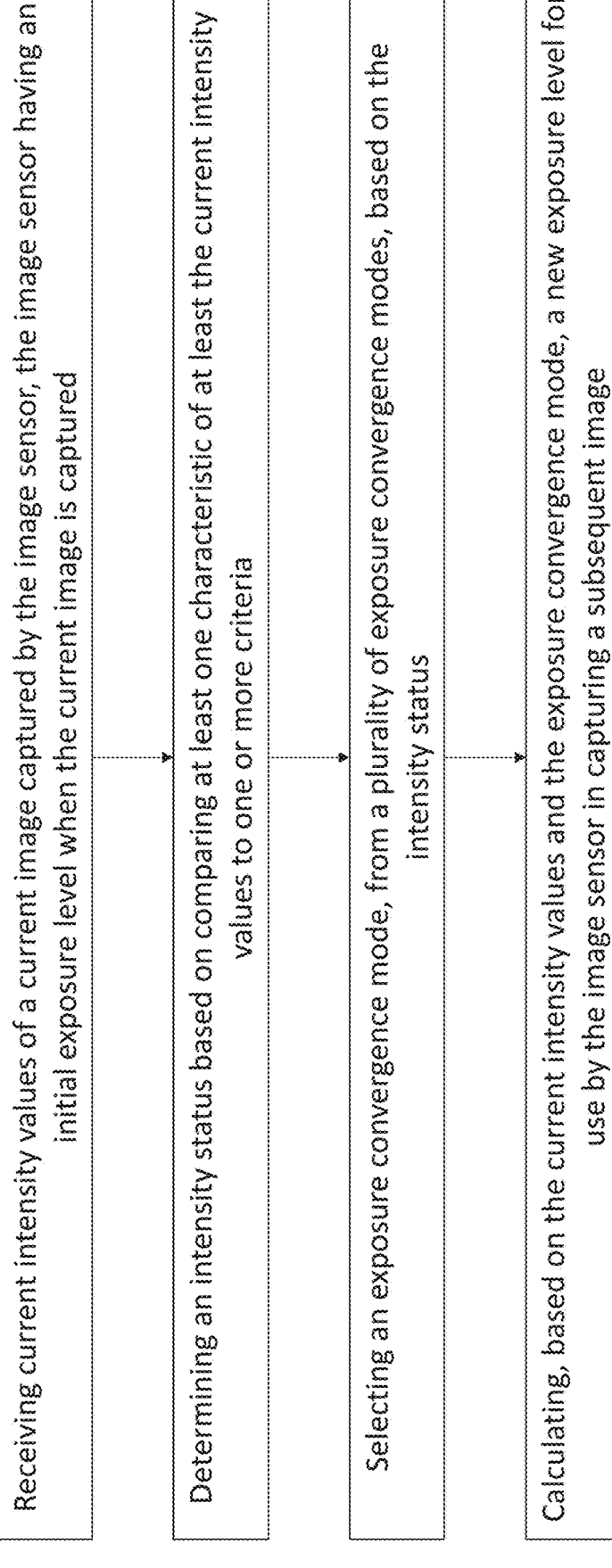

Receiving current intensity values of a current image captured by the image sensor, the image sensor having an initial exposure level when the current image is captured Determining an intensity status based on comparing at least one characteristic of at least the current intensity values to one or more criteria Selecting an exposure convergence mode, from a plurality of exposure convergence modes, based on the intensity status Calculating, based on the current intensity values and the exposure convergence mode, a new exposure level for use by the image sensor in capturing a subsequent image

Figure 3

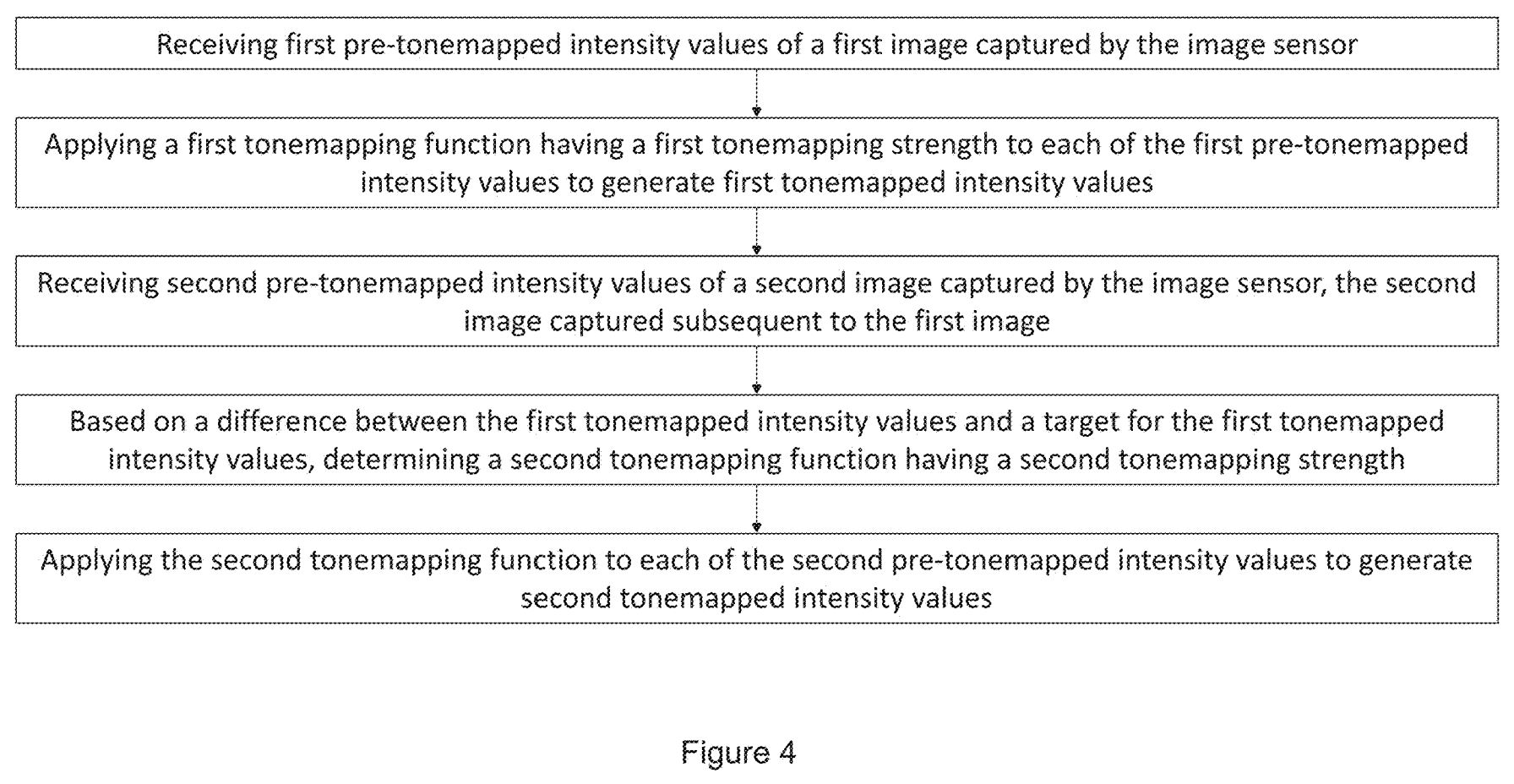

Receiving first pre-tonemapped intensity values of a first image captured by the image sensor Applying a first tonemapping function having a first tonemapping strength to each of the first pre-tonemapped intensity values to generate first tonemapped intensity values Receiving second pre-tonemapped intensity values of a second image captured by the image sensor, the second image captured subsequent to the first image Based on a difference between the first tonemapped intensity values and a target for the first tonemapped intensity values, determining a second tonemapping function having a second tonemapping strength Applying the second tonemapping function to each of the second pre-tonemapped intensity values to generate second tonemapped intensity values

Figure 4

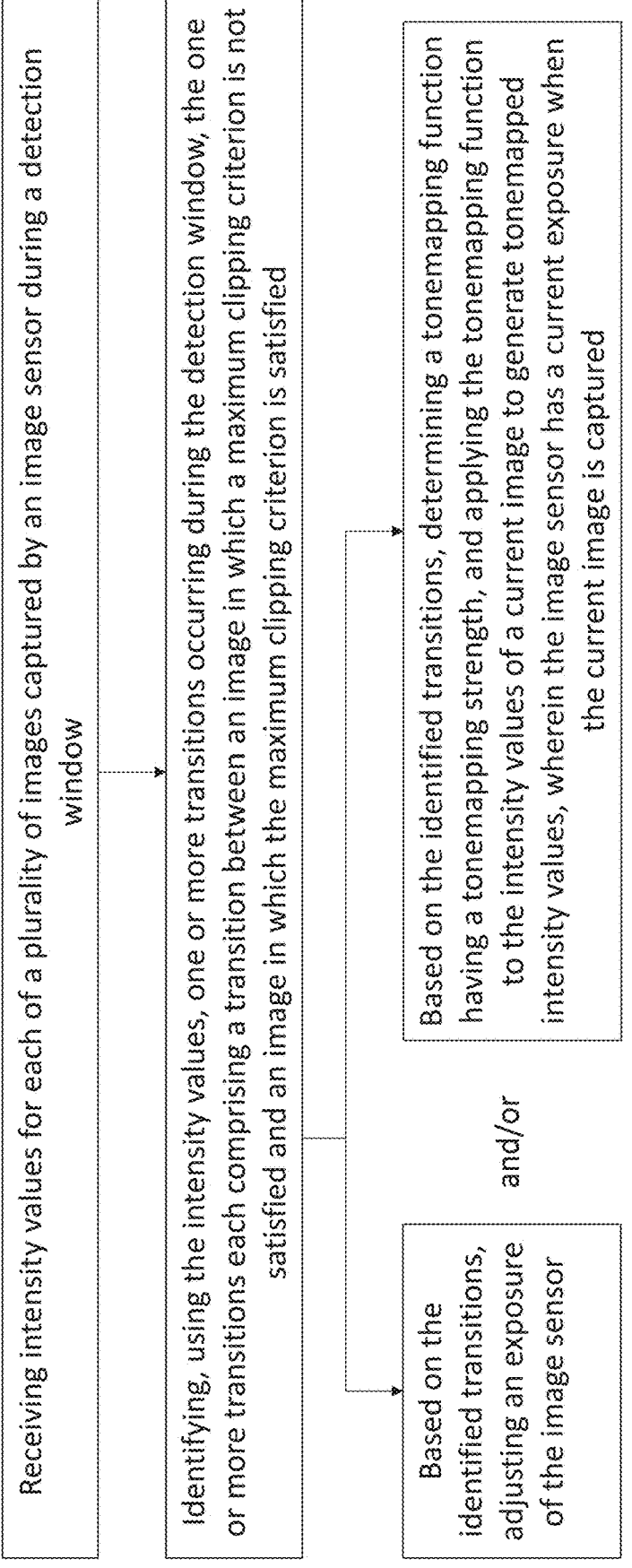

Receiving intensity values for each of a plurality of images captured by an image sensor during a detection window Identifying, using the intensity values, one or more transitions occurring during the detection window, the one or more transitions each comprising a transition between an image in which a maximum clipping criterion is not satisfied and an image in which the maximum clipping criterion is satisfied Based on the identified transitions, adjusting an exposure of the image sensor and/or Based on the identified transitions, determining a tonemapping function having a tonemapping strength, and applying the tonemapping function to the intensity values of a current image to generate tonemapped intensity values, wherein the image sensor has a current exposure when the current image is captured

Figure 5

METHOD, APPARATUS AND PROGRAM FOR ADJUSTING AN EXPOSURE LEVEL

CROSS-REFERENCE TO RELATED APPLICATIONS

This application claims the benefit under 35 U.S.C. § 119(a) and 37 CFR § 1.55 to UK patent application no. 2211961.4, UK patent application no. 2211962.2, and U.S. patent application Ser. No. 17/820,055, and the entire contents of each of these applications is incorporated herein by reference.

TECHNICAL FIELD

The present invention relates to image processing and in particular, processing of images for autonomous vehicle applications.

BACKGROUND

Machine learning algorithms have emerged as a powerful tool for object recognition. In autonomous driving applications, images captured by image sensors can have a very high dynamic range (which is a measure of the contrast between dark and bright regions of the image). In such images, certain bright regions of the image (comprising "clipped pixels") may have a brightness which is equal to or exceeds a maximum intensity value that can be captured by the image sensor. It may be desirable to reduce the number of clipped pixels in an image, so that an object recognition algorithm to which a result image is applied may successfully detect objects in the output image.

Reducing the number of clipped pixels in an image may be achieved by reducing the exposure level of the image sensor. In autonomous driving applications, a change in average brightness of an image between one image and the next image may occur very quickly. Therefore, it is desirable to adjust the exposure level of the image sensor quickly in response to such changes.

However, when the images comprise a temporally oscillating light source, such as an emergency vehicle, streetlights being passed in succession, on-coming vehicles, or the sun shining through trees, a quickly-adjusting exposure level may lead to fluctuations in the intensity of the output images. For example, the outputted intensity of a region of the image corresponding to a certain area of the scene may fluctuate, even if the true brightness of that region has not changed, because the exposure level of the sensor has changed in response to an oscillating light source in a different area of the scene. In addition to clipped pixels, such fluctuations may hinder the object detection model. In fast-changing, high dynamic range images, capturing as much of the scene with as few clipped pixels as possible, and reducing fluctuations in the intensity of the output images, may become competing requirements when adjusting the exposure level of the image sensor. It is therefore desirable to also provide a method for detecting oscillations in an image, and a method for reducing oscillations in a result image.

SUMMARY

According to a first aspect of the present invention, there is provided a method for adjusting an exposure level of an image sensor, comprising: receiving current intensity values of a current image captured by the image sensor, the image sensor having an initial exposure level when the current image is captured; determining an intensity status based on comparing at least one characteristic of at least the current intensity values to one or more criteria; selecting an exposure convergence mode, from a plurality of exposure convergence modes, based on the intensity status; and calculating, based on the current intensity values and the exposure convergence mode, a new exposure level for use by the image sensor in capturing a subsequent image.

The method may comprise calculating the new exposure level based on the current intensity values, the exposure convergence mode, and a target intensity value.

The method may comprise: comparing each of the current intensity values to a criterion; and comparing a characteristic of the current intensity values satisfying the criterion to a maximum clipping criterion, wherein if the maximum clipping criterion is not satisfied, the method comprises: calculating a gain value, wherein applying the gain value to the current intensity values causes the maximum clipping criterion to be satisfied; and calculating, based on the gain value, the target intensity value.

The method may comprise: comparing each of the current intensity values to a criterion; and comparing a characteristic of the current intensity values satisfying the criterion to a maximum clipping criterion, wherein if the maximum clipping criterion is satisfied, the target intensity value is an anti-flicker target intensity value used for an anti-flicker image captured by the image sensor prior to the current image.

The method may comprise receiving intensity values of at least one image captured by the image sensor during a detection window, and determining the intensity status may comprise: identifying, using the intensity values of the current image and the at least one image captured during the detection window, one or more transitions occurring during the detection window, the one or more transitions each comprising a transition between an image in which the maximum clipping criterion is not satisfied and an image in which the maximum clipping criterion is satisfied; and based on the identified transitions, determining that the intensity status is an oscillation status.

The method may comprise: calculating an average intensity value of the current intensity values; and calculating, based on the average intensity value and the target intensity value, an intensity value error, wherein calculating the new exposure level comprises calculating the new exposure level based on the intensity value error and the exposure convergence mode.

Determining the intensity status may comprise: comparing the intensity value error to a speed-up threshold, wherein if the intensity value error is lower than the speed-up threshold, determining the intensity status comprises determining that the intensity status is a standard operating status and selecting the exposure convergence mode comprises selecting a first exposure convergence mode, and if the intensity value error is greater than the speed-up threshold, determining the intensity status comprises determining that the intensity status is a speed-up status and selecting the exposure convergence mode comprises selecting a second exposure convergence mode, wherein the second exposure convergence mode corresponds to a faster exposure convergence rate than the first exposure convergence mode.

Comparing the intensity value error to a speed-up threshold may be performed in response to determining that there are no transitions occurring during the detection window.

The method may comprise: for each prior image of at least one prior image captured by the sensor prior to the current image, calculating a prior intensity value error, wherein calculating the new exposure level comprises calculating the new exposure level further based on a sum of the prior intensity value errors.

Determining the intensity status may comprise comparing the average intensity value to a bright image criterion and/or a dark image criterion.

The method may comprise: calculating an image contrast based on the current intensity values; and comparing the image contrast to a dynamic range threshold, wherein if the image contrast is lower than the dynamic range threshold, the target intensity value has a predefined value.

The initial exposure level may comprise an initial gain factor and an initial integration interval, the sensor may capture pixel values by measuring an amount of light reaching the sensor during the initial integration interval, the initial gain factor may be applied to the pixel values to obtain the current intensity values, and calculating the new exposure level may comprise determining a new gain factor and a new integration interval, wherein the new gain factor and the new integration interval are related by a predefined relation.

The method may comprise receiving intensity values of the subsequent image, the image sensor having the new exposure level when the subsequent image is captured; and detecting at least one physical object represented by the subsequent image.

According to a second aspect of the present invention, there is provided a non-transitory computer-readable storage medium comprising instructions which, when executed by a computer, cause the computer to perform a method according to the first aspect.

According to a third aspect of the present invention, there is provided a system configured to perform a method according to the first aspect.

Further features and advantages of the invention will become apparent from the following description of preferred embodiments of the invention, given by way of example only, which is made with reference to the accompanying drawings.

BRIEF DESCRIPTION OF THE DRAWINGS

FIG. 3 is a flow diagram showing a method for adjusting an exposure level according to some embodiments;

FIG. 4 is a flow diagram showing a method for processing an image according to some embodiments;

FIG. 5 is a flow diagram showing a method for detecting temporal oscillations according to some embodiments;

DETAILED DESCRIPTION

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Figure 1:
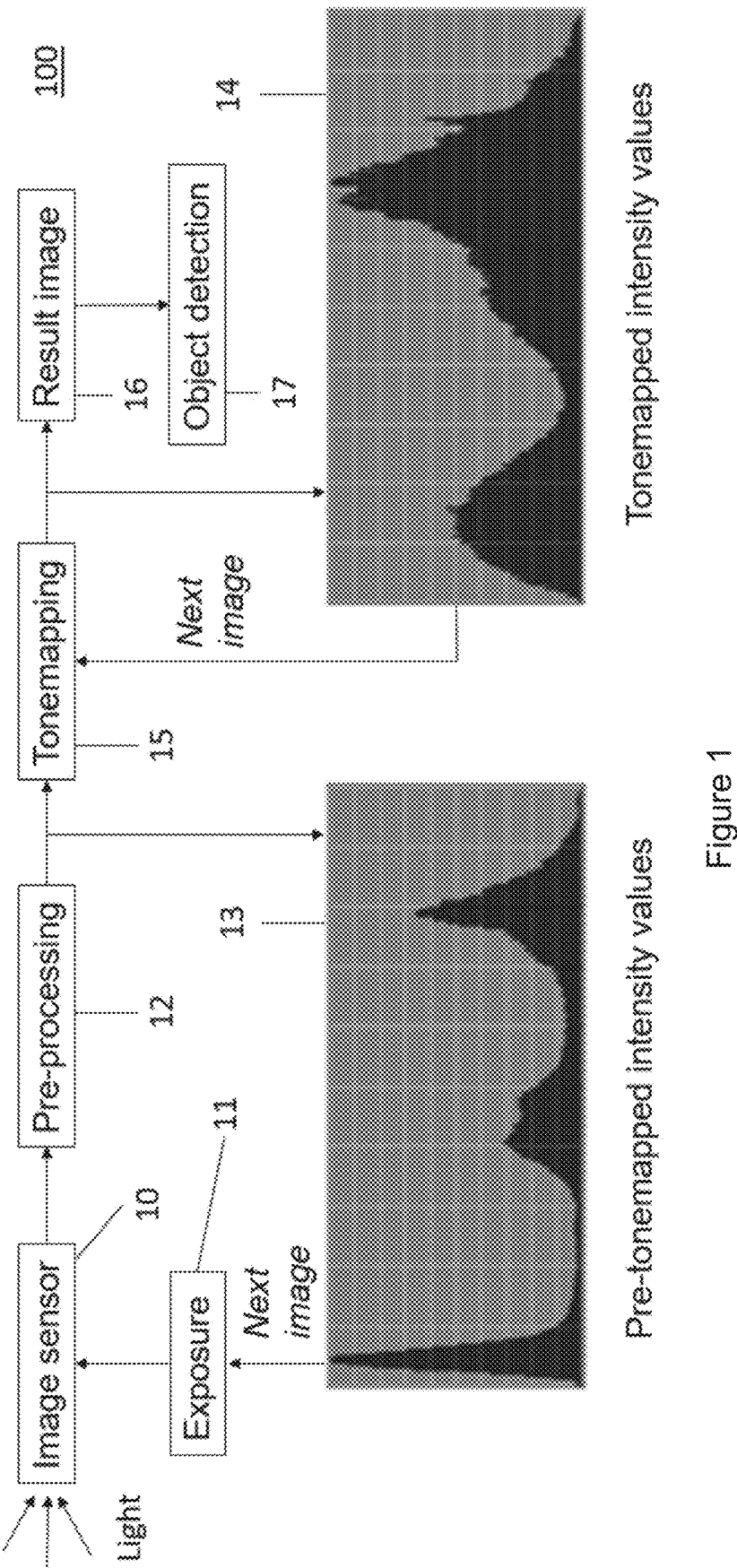
FIG. 1 is a flow diagram showing a method for simultaneously processing an image and adjusting an exposure level of an image sensor according to some embodiments.

FIG. 1 is a flow diagram showing a method 100 for simultaneously processing an image and adjusting an exposure level 11 of an image sensor 10 according to some embodiments. For a given frame, an image sensor 10 having an exposure level 11 may capture a plurality of pixel values by measuring an amount of light reaching the image sensor 10. The exposure level 11 may comprise an integration interval during which the image sensor 10 measures the amount of light reaching it. The image sensor 10 may comprise a plurality of capacitors, each capacitor configured to measure an amount of light reaching the capacitor to determine one of the pixel values. The exposure level 11 may comprise a gain that is applied to the pixel values to obtain intermediate pixel values. The gain may be an analogue gain that is applied prior to converting the intermediate pixel values to a digital representation.

Pre-processing 12 may be applied to the intermediate pixel values to generate pre-tonemapped intensity values 13, which may be referred to simply as intensity values. The pre-processing 12 may comprise a conversion to a digital representation, a digital gain, vignetting correction, and/or other processing.

When adjusting the exposure level 11, the analogue gain, the digital gain, and/or the integration interval may be adjusted. Raising the integration interval can cause motion artifacts, while raising the analogue gain or the digital gain can amplify noise. In order to limit the motion artifacts and the noise, Table 1 may be used to determine how the gain and the integration interval can be simultaneously adjusted.

TABLE 1

| simultaneous adjustment of gain and noise | |
| --- | --- |
| Integration interval (ms) | Gain |
| 10 | 2 |
| 30 | 4 |
| 60 | 6 |
| 100 | 8 |

The relationship between integration interval and gain may be adjusted depending on the application.

In addition, conversion to a digital representation typically comprises a degree of rounding to be performed, leading to a quantisation error. When applying digital gain, the quantisation error may be amplified. Hence, it may be desirable to use analogue gain instead of digital gain where possible.

The pre-tonemapped intensity values 13 may be represented by a pre-tonemapping histogram. An example pre-tonemapping histogram is described below with reference to FIG. 2. The horizontal axis of the histogram may represent intensity value, and the vertical axis may represent the number of pixels. The intensity values may be used to calculate the exposure level of the next image, as will be described with reference to FIG. 3.

Tonemapping 15 may be applied to the pre-tonemapped intensity values 13. The tonemapping 15 may comprise applying a tonemapping function to the pre-tonemapped intensity values 13 to generate tonemapped intensity values 14. The tonemapping function may comprise a plurality of tonemapping curves, each tonemapping curve applied to a different region of the image. The tonemapping function may be parameterised by a tonemapping strength, an exposure level gain, and/or a dark enhancement. The tonemapped intensity values 14 may be represented by a post-tonemapping histogram. The combination of tonemapped intensity values 14 and pre-tonemapped intensity values 13 may be used to calculate the tonemapping strength of the next image, as will be described with reference to FIG. 4.

A result image 16 may be formed from the tonemapped intensity values 14. The result image 16 may be used as input to an object detection algorithm 17. The object detection algorithm 17 may be configured to detect at least one physical object represented by the result image 16. Based on the detection of at least one physical object, a vehicle on which the image sensor 10 is mounted may determine a course of action. The vehicle may be an autonomous vehicle.

FIG. 3 shows a method for adjusting the exposure level 11 according to some embodiments. The method may comprise receiving current intensity values of a current image captured by the image sensor 10. The current image may be hereinafter referred to with the index i. The current intensity values may be the pre-tonemapped intensity values 13. The image sensor 10 may have an initial exposure level $E_i$ when the current image is captured. The method may comprise determining an intensity status based on comparing at least one characteristic of at least the current intensity values to one or more criteria. Examples of the intensity statuses will be described in more detail with reference to FIG. 6. The method may comprise selecting an exposure convergence mode, from a plurality of exposure convergence modes, based on the intensity status. The exposure convergence modes will be defined below by the coefficients $K_1$ and $K_2$ as used in equation (1). The method may comprise calculating, based on the current intensity values and the exposure convergence mode, a new exposure level for use by the image sensor in capturing a subsequent image. The subsequent image may be referred to with the index i+1. The new exposure may be calculated according to the method described below with reference to FIG. 2, for example using equations (1) and (5). Comparing at least one characteristic of the current intensity values to one or more criteria may allow a more robust and/or flexible adjustment of the exposure level.

The method may comprise calculating the new exposure level based on the current intensity values, the exposure convergence mode, and a target intensity value. The target intensity value may be calculated as described below with reference to FIG. 2. By appropriately selecting a target intensity value, the new exposure level may be closer to a desired exposure level.

The method may comprise comparing each of the current intensity values to a criterion. The criterion may be a maximum intensity value which can be represented. The method may comprise comparing a characteristic of the current intensity values satisfying the criterion to a maximum clipping criterion. The characteristic of the intensity values satisfying the criterion may be, for example, a number of percentage of the intensity values satisfying the criterion. The maximum clipping criterion may be a predetermined number or percentage of intensity values. The maximum clipping criterion may be referred to as a clipping threshold, and comparing a characteristic of the intensity values satisfying the criterion to a maximum clipping criterion may be performed as described with reference to FIG. 2. If the maximum clipping criterion is not satisfied, the method may comprise: calculating a gain value, wherein applying the gain value to the current intensity values causes the maximum clipping criterion to be satisfied; and calculating, based on the gain value, the target intensity value. Calculation of the gain value may be performed as described with reference to FIG. 2. The target intensity value may represent a target average intensity value. Calculating the target intensity value in this way may allow for a greater dynamic range to be captured by the image sensor while maintaining the number of clipped pixels within acceptable ranges.

The method may comprise: comparing each of the current intensity values to a criterion; and comparing a characteristic of the current intensity values satisfying the criterion to a maximum clipping criterion, wherein if the maximum clipping criterion is satisfied, the target intensity value is an anti-flicker target intensity value for an anti-flicker image captured by the image sensor 10 prior to the current image. The target intensity value may be selected from an anti-flicker buffer as described with reference to FIG. 2. Selecting a target intensity value in this way may allow for a target intensity value to be determined when the number of clipped pixels meets a criterion, for example when an oscillating light source causes the number of clipped pixels to temporarily meet the criterion.

The method may comprise receiving intensity values of at least one image captured by the image sensor 10 during a detection window. Determining the intensity status may comprise: identifying, using the intensity values of the current image and the at least one image captured during the detection window, one or more transitions occurring during the detection window, the one or more transitions each comprising a transition between an image in which the maximum clipping criterion is not satisfied and an image in which the maximum clipping criterion is satisfied; and based on the identified transitions, determining that the intensity status is an oscillation status. The transitions may be identified using the method described with reference to FIG. 7. The transitions may comprise transitions from an image in which the maximum clipping criterion is not satisfied to an image in which the maximum clipping criterion is satisfied, and/or vice versa. Calculating an exposure convergence rate based on the identified transitions may be performed using equations (16)-(19) and (5) as described with reference to FIG. 7. Using identified transitions to calculate the exposure convergence rate may allow for a reduction in the exposure convergence rate when an oscillating light source is detected, so that the exposure level does not oscillate excessively in the presence of an oscillating light source. This may assist an object detection algorithm in detecting objects in the scene captured by the image sensor, the objects including objects other than the oscillating light source.

The method may comprise calculating an average intensity value of the current intensity values. The average intensity value may comprise, for example, a mean intensity value or a median intensity value. The method may comprise calculating, based on the average intensity value and the target intensity value, an intensity value error. The intensity value error may be calculated by subtracting the average intensity value from the target intensity value. Calculating the new exposure level may comprise calculating the new exposure level based on the intensity value error and the exposure convergence mode, for example as described with reference to equation (1). Calculating an intensity value error in this way may enable a more appropriate new exposure level to be calculated based on the exposure convergence rate and the intensity value error.

Determining the intensity status may comprise comparing the intensity value error to a speed-up threshold. If the intensity value error is lower than the speed-up threshold, determining the intensity status may comprise determining that the intensity status is a standard operating status and selecting the exposure convergence mode comprises selecting a first exposure convergence mode. If the intensity value error is greater than the speed-up threshold, determining the intensity status comprises determining that the intensity status is a speed-up status and selecting the exposure convergence mode comprises selecting a second exposure convergence mode. The second exposure convergence mode may correspond to a faster exposure convergence rate than the first exposure convergence mode. The exposure convergence rate may be calculated according to equation (5), in conjunction with equations (6)-(8) or (13)-(15). Raising the exposure convergence rate when the intensity value error is greater than a speed-up threshold may allow for improved exposure level convergence in highly under-exposed or highly over-exposed scenarios.

Comparing the intensity value error to the speed-up threshold may be performed in response to determining that there are no transitions occurring during the detection window. By comparing the characteristics of the intensity values to the criteria in this order, the computational efficiency of the method of adjusting the exposure level may be improved.

The method may comprise: for each prior image of at least one prior image captured by the sensor prior to the current image, calculating a prior intensity value error, wherein calculating the new exposure level may comprise calculating the new exposure level further based on a sum of the prior intensity value errors. The sum of the prior intensity value errors may be defined by equation (2). By additionally using a sum of the prior intensity value errors to calculate the new exposure level, undesirable flashing/overshooting in an image captured with the new exposure level may be avoided.

Determining the intensity status may comprise comparing the average intensity value to a bright image criterion and/or a dark image criterion. If the bright image criterion or the dark image criterion is satisfied, the exposure convergence rate may have a predefined value. The bright image criterion may correspond to a total minimum clipping intensity status. The dark image criterion may correspond to a total maximum clipping intensity status. The exposure convergence rate may be calculated using equation (5), in conjunction with equations (3)-(4) or (11)-(12). Using a predefined value for the exposure convergence rate, instead of a value calculated based on a target intensity value, may be appropriate when the image is very bright or very dark, for example when all of the intensity values are at a minimum intensity value which can be represented, or all of the intensity values are at a maximum intensity value which can be represented.

The method may comprise calculating an image contrast based on the current intensity values. The image contrast may be calculated as described with reference to FIGS. 9a and 9b. The method may comprise comparing the image contrast to a dynamic range threshold, wherein if the image contrast is lower than the dynamic range threshold, the target intensity value has a predefined value. The predefined value may be target_LDR. Setting the target intensity value to a predefined value may be appropriate when a number of clipped intensity values is not expected to be high, so that oscillations in the intensity of a result image may be reduced and objects represented by the image may be detected.

The initial exposure level may comprise an initial gain factor and an initial integration interval, the sensor may capture pixel values by measuring an amount of light reaching the sensor during the initial integration interval, the initial gain factor may be applied to the pixel values to obtain the current intensity values, and calculating the new exposure level may comprise determining a new gain factor and a new integration interval, wherein the new gain factor and the new integration interval are related by a predefined relation, for example as described with reference to FIG. 1 and Table 1. The initial gain factor may be an analogue gain factor or a digital gain factor. Additional processing may also be applied to the pixel values to obtain the current intensity values. By using a predefined relation between the integration interval and the gain factor, noise exaggerated by the gain and motion artifacts caused by the integration interval may be reduced.

The method may comprise receiving intensity values of the subsequent image, the image sensor 10 having the new exposure level when the subsequent image is captured. The new exposure level may be referred to as $E_{i+1}$. The method may comprise detecting at least one physical object represented by the subsequent image. The object may be, for example, a vehicle, a motorway reservation, a tunnel entrance, the sky, or a roadsign. Adjusting the exposure level using the methods described herein and using an image captured using the new exposure level may enable improved detection of objects represented by the subsequent image.

FIG. 4 shows a method for processing an image according to some embodiments. The method may comprise receiving first pre-tonemapped intensity values of a first image captured by the image sensor 10. The first image may be referred to with an index i–1. The method may comprise applying a first tonemapping function having a first tonemapping strength to the first pre-tonemapped intensity values to generate first tonemapped intensity values. A tonemapping strength may refer to a dark enhancement value. The method may comprise receiving second pre-tonemapped intensity values of a second image captured by the image sensor 10, the second image captured subsequent to the first image. The second image may be referred to with an index i. The method may comprise, based on a difference between the first tonemapped intensity values and a target for the first tonemapped intensity values, determining a second tonemapping function having a second tonemapping strength. The difference may be referred to as a post-tonemapping difference $\Delta R_i$. The second tonemapping strength may be calculated from a pre-compensation tonemapping strength and a compensating factor according to equation (27). The compensating factor may be calculated based on the first pre-tonemapped intensity values through the median tonemapped intensity value $R_{i-1}$ using equations (24)-(26). The method may comprise applying the second tonemapping function to the second pre-tonemapped intensity values to generate second tonemapped intensity values. A result image 16 may comprise the second pre-tonemapped intensity values.

The method may comprise determining the second tonemapping function further based on the first pre-tonemapped intensity values. This may be done through a pre-compensation tonemapping strength. The pre-compensation tonemapping strength may be calculated from the first pre-tonemapped intensity values as described with reference to FIGS. 8, 9a and 9b.

The method may comprise calculating an image contrast based on the first pre-tonemapped intensity values. The image contrast may be calculated as described with reference to FIGS. 9a and 9b. The method may comprise calculating a first preliminary tonemapping strength based on the image contrast. The first preliminary tonemapping strength may be calculated using the method described with reference to FIG. 9b. The method may comprise calculating a second preliminary tonemapping strength based on an average of the first pre-tonemapped intensity values. The second preliminary tonemapping strength may be calculated using the method described with reference to FIG. 9a. The method may comprise, based on the first preliminary tonemapping strength and the second preliminary tonemapping strength, calculating the second tonemapping strength. The first and second preliminary tonemapping strengths may both be maximum strengths as described with reference to FIGS. 8, 9a and 9b. The second tonemapping strength may be calculated based on a minimum of the first preliminary tonemapping strength and the second preliminary tonemapping strength.

The method may comprise determining a cut intensity value, defined in that a predetermined number of the first pre-tonemapped intensity values are below the cut intensity value, such as the intensity value pD_cut described with reference to FIG. 8. The method may comprise calculating, based on the cut intensity value and a predetermined dark pixel target intensity value, a gain. The predetermined dark pixel target intensity value may be dark_prc_gain_target. The method may comprise calculating the second tonemapping strength based on the gain, for example as described with reference to FIG. 8.

The second tonemapping strength may be calculated based on an average tonemapping strength for tonemapping functions applied to a plurality of images captured by the image sensor 10 prior to the second image, for example as described with reference to equation (20).

The image sensor 10 may have a current exposure level when the second image is captured, and the second tonemapping strength may be calculated based on the current exposure level. The second tonemapping strength may in this way be calculated by first calculating the instantaneous tonemapping strength described with reference to FIGS. 9a and 9b.

The method may comprise receiving, for each of a series of images captured by the image sensor 10, an exposure level. The method may comprise calculating an average exposure level of the exposure levels of the series of images, for example as described with reference to FIG. 7 and equation (22). The method may comprise, based on a difference between the average exposure level and the current exposure level, calculating the second tonemapping strength, for example according to equations (23), (26) and (27).

The image sensor 10 may have an initial exposure level when the first image is captured, the second image may be captured immediately subsequent to the first image, and the second tonemapping strength may be calculated based on a difference between the initial exposure level and the current exposure level, and a value representative of an average of the first pre-tonemapped intensity values. The second tonemapping strength may be calculated using equation (28). In such a case, the second tonemapping strength may be a measure of an exposure level gain.

The target for the first tonemapped intensity values may be an average of third tonemapped intensity values, and the third tonemapped intensity values may be generated using third pre-tonemapped intensity values of a set of images captured by the image sensor 10 prior to the first image. The target for the first tonemapped intensity values may be an average median tonemapped intensity value. Alternatively, the target for the first tonemapped intensity values may be a predetermined value.

A second average tonemapped intensity value of the second tonemapped intensity values may be between a first average tonemapped intensity value of the first tonemapped intensity values and the target for the first tonemapped intensity values.

The difference between the first tonemapped intensity values and the target for the first tonemapped intensity value may be calculated by subtracting the first average tonemapped intensity value from the second average tonemapped intensity value, and the second tonemapping strength may be an exponential function of the difference, for example according to equation (26).

The method may comprise detecting that the first image and the second image comprise an oscillating light source. This detection may be performed as described with reference to FIG. 7.

The method may comprise calculating the second tonemapping strength based on a frequency of the oscillating light source. A hysteresis weight H may be calculated, for example according to equations (16) and (17), and this may be used to calculate the second tonemapping strength, for example according to equations (24), (26) and (27).

FIG. 5 shows a method for detecting temporal oscillations according to some embodiments. The method may comprise receiving intensity values for each of a plurality of images captured by an image sensor 10 during a detection window. The method may comprise identifying, using the intensity values, one or more transitions occurring during the detection window, the one or more transitions each comprising a transition between an image in which a maximum clipping criterion is not satisfied and an image in which the maximum clipping criterion is satisfied. The transitions may be identified using the method described with reference to FIG. 7. The method may comprise, based on the identified transitions, at least one of: adjusting an exposure level of the image sensor 10; and determining a tonemapping function having a tonemapping strength, and applying the tonemapping function to the intensity values of a current image to generate tonemapped intensity values 14, wherein the image sensor 10 has a current exposure level when the current image is captured.

The method may comprise calculating a new exposure level based at least on the identified transitions. Calculating the new exposure level based on the identified transitions may be performed using equations (16)-(19) and (5) as described with reference to FIG. 7. The method may comprise adjusting the exposure level of the image sensor 10 to the new exposure level, wherein the image sensor 10 has the new exposure level when a new image is captured. The new image may be referred to with the index (i+1).

Calculating the new exposure level may comprise calculating, based further on the intensity values of the current image and a target intensity value, the new exposure level. The target intensity value may be calculated as described below with reference to FIG. 2. Calculating the new exposure level in this way may be performed using equation (1).

The method may comprise calculating an average intensity value of the intensity values of the current image. The average intensity value may be a mean, median, or other average measure of the received intensity values. The method may comprise calculating, based on the average intensity value and the target intensity value, an intensity value error. The intensity value error may be calculated by subtracting the average intensity value from the target intensity value. The new exposure level may be calculated further based on the intensity value error. This may be performed according to the method described below with reference to FIG. 2, for example using equation (1).

If the maximum clipping criterion is not satisfied for the current image, the method may comprise calculating a gain value, wherein applying the gain value to the intensity values of the current image causes the maximum clipping criterion to be satisfied; and calculating, based on the gain value, the target intensity value. Calculation of the gain value may be performed as described with reference to FIG. 2. The target intensity value may represent a target average intensity value.

Calculating the new exposure level may comprise calculating the new exposure level based on a further number of transitions occurring during a further detection window, wherein the further detection window and the detection window comprise disjoint sets of images captured by the image sensor 10. In such a case, the exposure convergence rate may be calculated using equation (17).

Determining if the maximum clipping criterion is satisfied may comprise comparing each of the intensity values to a criterion; and comparing a characteristic of the intensity values satisfying the criterion to the maximum clipping criterion. The characteristic of the intensity values satisfying the criterion may be a number of percentage of intensity values satisfying the criterion. The maximum clipping criterion may be a predetermined number or percentage of intensity values. The maximum clipping criterion may be referred to as a clipping threshold, and comparing a characteristic of the intensity values satisfying the criterion to a maximum clipping criterion may be performed as described with reference to FIG. 2.

The criterion may be a maximum intensity value which can be represented.

The image sensor 10 may have a respective exposure level when each image is captured, and the method may comprise: based on a difference between an average exposure level and the current exposure level, determining the tonemapping strength, wherein the average exposure level is an average of the respective exposure levels of each image of the plurality of images. The average exposure level may be calculated as described with reference to FIG. 7 and equation (22). Determining the tonemapping strength may be performed according to equations (23), (26) and (27).

The method may comprise calculating, based on a first average tonemapped intensity value and a second average tonemapped intensity value, a tonemapped intensity value error. The tonemapped intensity value error may be referred to as a post-tonemapping difference and may be calculated using equation (24). The first average tonemapped intensity value may be an average of the tonemapped intensity values, the second average tonemapped intensity value may be an average of second tonemapped intensity values of a set of at least two images captured by the image sensor 10, and the second tonemapped intensity values may be generated by applying at least one tonemapping function to the intensity values of the set of images. The second average tonemapped intensity value may be an average median tonemapped intensity value. The method may comprise, based on the tonemapped intensity value error, determining the tonemapping strength, for example using equation (26).

A third average tonemapped intensity value of the tonemapped intensity values may be between the first average tonemapped intensity value and the second average tonemapped intensity value.

The tonemapped intensity value error may be calculated by subtracting the first average tonemapped intensity value from the second average tonemapped intensity value, and the tonemapping strength is an exponential function of the tonemapped intensity value error, for example according to equation (26).

The method may comprise detecting at least one object represented by at least one of the plurality of images. The object may be, for example, a vehicle, a motorway reservation, a tunnel entrance, the sky, or a roadsign.

Figure 2:
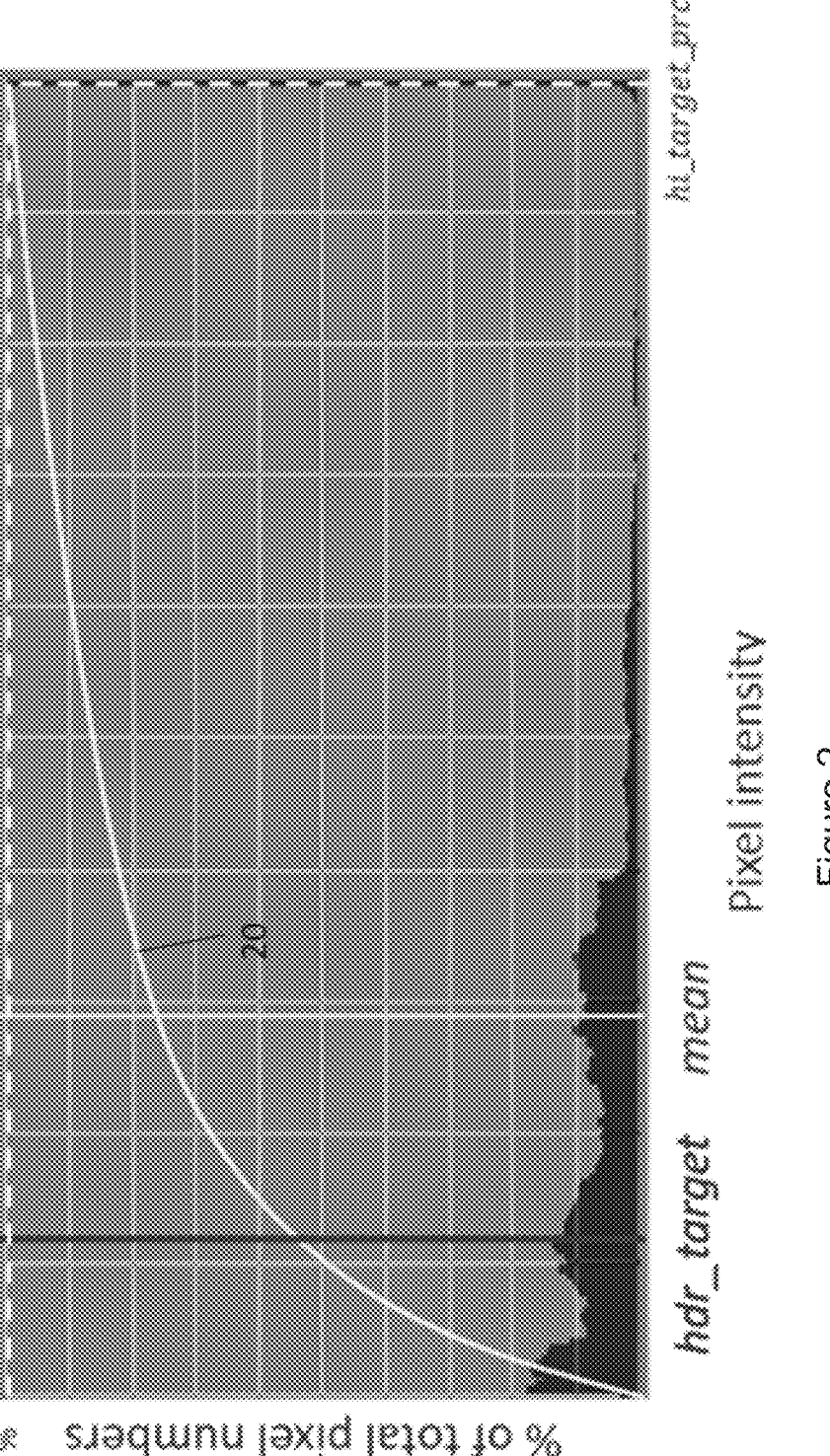
FIG. 2 is a histogram of pre-tonemapped intensity values.

FIG. 2 shows an example pre-tonemapping histogram indicating pre-tonemapped intensity values. In this example, the vertical axis represents the percentage of total pixel numbers. The mean of the pre-tonemapped intensity values is indicated by a vertical line. The curve 20 represents the cumulative histogram; that is, the vertical coordinate of a point on curve 20 is the percentage of the total pixel numbers having a pre-tonemapped intensity value less than or equal to the horizontal coordinate of the point on the curve 20. It is to be understood that the curve 20 is drawn for the purposes of illustration only and may not exactly match the pre-tonemapped intensity values shown in the histogram. For the purposes of describing FIG. 2 and FIG. 6, "pre-tonemapped intensity values" may be referred to simply as "intensity values".

The invention according to some embodiments includes a method for calculating a target intensity value to be used to calculate a new exposure level. This target intensity value is to be distinguished from a target for tonemapped intensity values and a predetermined dark pixel target intensity value referred to elsewhere in this description. The target intensity value may be a target average intensity value. The method may use a parameter hi_target_prc. hi_target_prc may represent a maximum acceptable percentage of clipped intensity values. A clipped intensity value may be an intensity value corresponding to a pixel value equal to or greater than a maximum pixel value which can be represented by the sensor. Alternatively, a clipped intensity value may be a maximum intensity value which can be digitally represented. In any case, the clipped intensity values may have an intensity value greater than or equal to a clipping threshold.

The intensity value hi_target_prc_cut below which the percentage hi_target_prc of pixels lie may be determined. hi_target_prc_cut may be compared with the clipping threshold.

If hi_target_prc_cut is less than the clipping threshold, then the percentage of clipped intensity values may be below the maximum acceptable percentage. The variable "exposure level target unknown" may be set to false, as will be described with reference to FIG. 7. The target intensity value may be calculated by determining the gain required to make hi_target_prc_cut be equal to the clipping threshold. The aim would therefore be to use the maximum exposure level possible while keeping the number of clipped intensity values within a predefined acceptable limit. The target intensity value may be determined based on the gain. For example, an average intensity value of the pre-tonemapped intensity values may be multiplied by the gain to determine the target intensity value. The target intensity value may therefore represent a target average intensity value. The average intensity value may be a mean of the pre-tonemapped intensity values.

If hi_target_prc_cut is greater than or equal to the clipping threshold, then the target intensity value may not be calculated using the same method. This is because the intensity values greater than the clipping threshold may not be represented or known, and hence the gain (which in this case would be less than 1) that may be used to make hi_target_prc_cut be equal to the clipping threshold cannot be calculated. The variable "exposure level target unknown" may be set to true. In such a case, the target intensity value may be selected from an anti-flicker buffer. Oscillating light sources may provide time-varying contributions to the intensity values. When an oscillating light source is in a bright phase, the clipping threshold may temporarily be exceeded. However, on the basis of detecting the oscillating light source, it may be predicted that the clipping threshold will no longer be exceeded after a particular period of time has elapsed. Therefore, instead of setting a new target intensity value, it may be appropriate to select a target intensity value from an anti-flicker buffer. The anti-flicker buffer may comprise one or more target intensity values calculated for prior images captured by the image sensor 10. Alternatively, in particular if an anti-flicker buffer does not exist or does not have any target intensity values, a previous target intensity value calculated for an immediately previous image captured by the image sensor 10 may be reduced by a predefined intensity value interval or a predefined ratio to calculate the target intensity value. If no previous target intensity value exists and hi_target_prc_cut is greater than or equal to the clipping threshold, then the target intensity value may take a predefined intensity value.

The target intensity value may be limited to be between a maximum value, target_LDR, and a minimum value, hdr_target.

In some circumstances, the target intensity value may be set to a predefined intensity value target_LDR. This may apply when an image contrast (represented by the intensity values captured by the image sensor 10) is lower than a predefined contrast value. target_LDR may be 18% grey.

Once the target intensity value has been calculated, an intensity value error may be calculated. An average intensity value of the intensity values may be calculated. The average intensity value may be, for example, a mean or median intensity value. The intensity value error may be calculated by subtracting the average intensity value from the target intensity value.

The intensity values of the pre-tonemapping histogram may each lie in a predefined range. For example, the histogram may indicate that 10 intensity values lie between 129 and 132, and the intensity values may not be known beyond this level of precision. As a result, the intensity value error may not be exact. Furthermore, the changes in the intensity value error from one image to the next image may be sudden. If the new exposure level is calculated directly from the intensity value error of a single image, the output intensity of the output image may vary undesirably.

For this reason, the new exposure level may be calculated based on not only the intensity value error, but also an integral or sum of the intensity value error, taken over multiple images captured by the image sensor 10, with respect to time.

The new exposure level may be calculated using the following general formula:

$$E_{i+1}=K_1\int_{t_0}^{t_i} \log_2(\Delta A(t))dt+K_2 \log_2(\Delta A(t_i)) \tag{1}$$

where t represents time, $t_i$ is the time of the current frame, $t_0$ is a reference time, $t_{i+1}$ is the time of the next frame, $E_i$ is the exposure level 11 at frame i, $K_1$ and $K_2$ are coefficients determined from the pre-tonemapping histogram, and $\Delta A(t)$ is the intensity value error at time t. The values of $K_1$ and $K_2$ may individually or collectively define an exposure convergence mode. $t_0$ may be the time at which the first image captured by the image sensor 10 after the image sensor 10 was most recently enabled, is captured. The term $$I(t_i)=\int_{t_0}^{t_i} \log_2(\Delta A(t))dt \tag{2}$$

may therefore represent the sum of the logarithm of the intensity value error taken over all images captured since the image sensor 10 was most recently turned on. It may or may not include the current frame.

Alternatively, $t_0$ may be $t_i - \Delta t_a$, where $\Delta t_a$ is a predetermined interval.

Using a logarithm of the intensity value error in equation (1) to determine the new exposure level may enable faster convergence of the exposure level 11. The arguments of the logarithmic functions in equations (1) and (2) may be limited to a value between 0 and a parameter max_exp.

Figure 6:
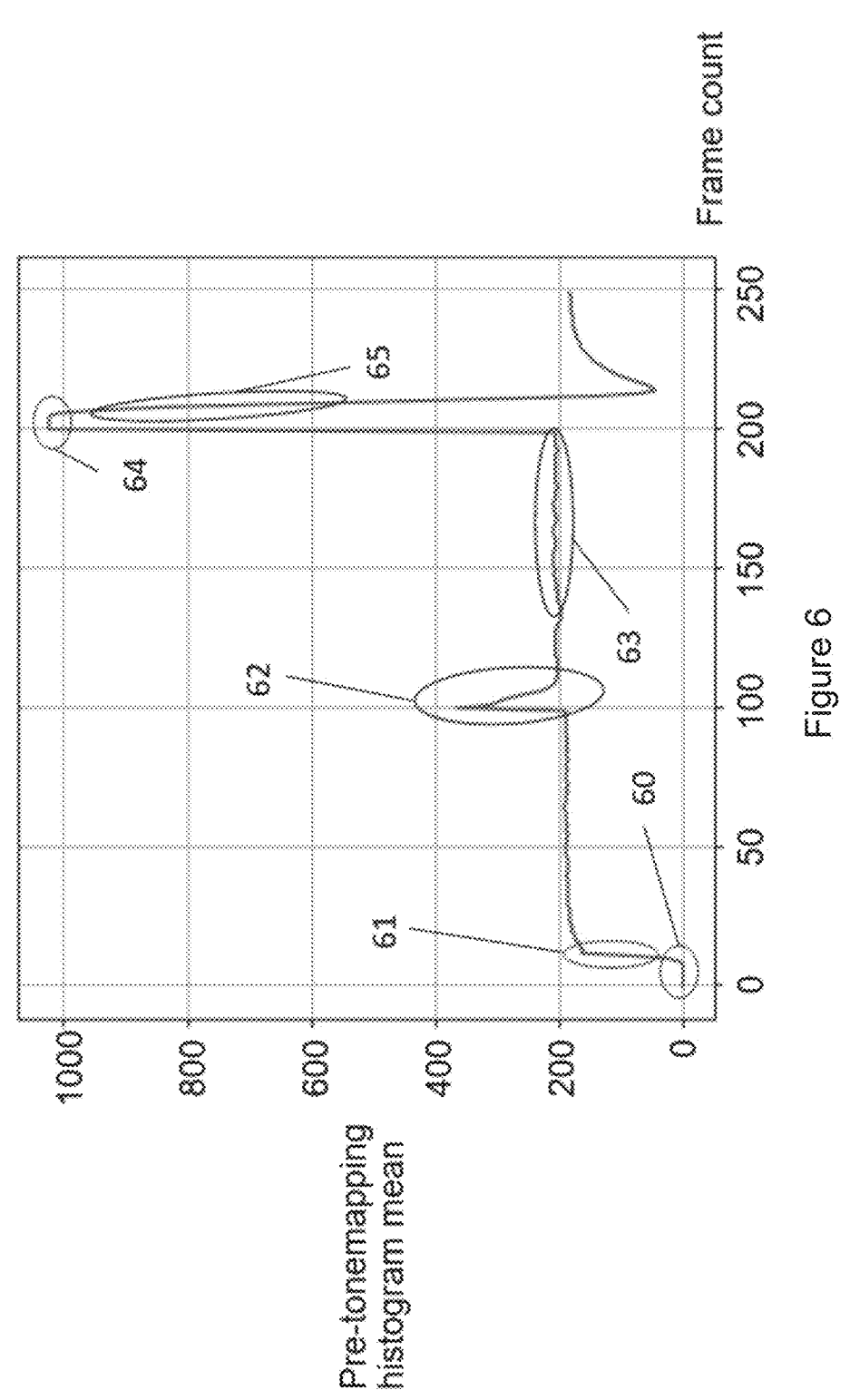
FIG. 6 is a graph of the mean of a pre-tonemapping histogram against time.

We now discuss how coefficients $K_1$ and $K_2$ may be determined with reference to FIG. 6. FIG. 6 shows an example graph depicting the time evolution of the mean of a pre-tonemapping histogram. Since the scene captured by the image sensor 10 may be changing, particularly if the image sensor 10 is mounted to a moving object such as a vehicle, the mean of the pre-tonemapping histogram may evolve with time. It may be desirable to maintain an average intensity value of the result image 16 at an approximately constant value, so that the object detection algorithm 17 is able to detect physical objects represented by the result image 16. To this end, the exposure level 11 of the image sensor 10 may be adjusted for capturing the next image, or a tonemapping function having a tonemapping strength may be determined.

At frame count 1, the pre-tonemapping histogram mean is 0, corresponding to a total minimum clipping intensity status 60. All of the intensity values may be 0. The image at frame count 1 may be very under-exposed. In this situation, a target intensity value and intensity value error may not be appropriate for calculating a new exposure level. Therefore, a fixed parameter d may be used to adjust the exposure level 11. The adjustment may be calculated as follows:

$$Err_p(t_i)=\log_2(d) \tag{3}$$

$$Err_I(t_i)=I(t_i)+c\times Err_p(t_i) \tag{4}$$

where c is a parameter. These terms may be combined to obtain the new exposure level as follows:

$$E_{i+1} = \frac{Err_I(t_i)}{c} + \frac{Err_P(t_i)}{p} \tag{5}$$

where p is a parameter. Note that in this case, the second term on the right hand side of equation (1) is replaced by a fixed value and does not depend on the intensity value error. The value of $K_1$ in this case is 1/c.

The terms $Err_I(t_i)$ and $Err_p(t_i)$ may be referred to individually or collectively as an exposure convergence rate.

The new exposure level $E_{i+1}$ may be greater than the initial exposure level $E_i$ of the image sensor 10 when frame 1 is taken. However, the new exposure level may still be too low. As can be seen in FIG. 6, the pre-tonemapping histogram mean remains at 0 for several frames.

Once the pre-tonemapping histogram mean has risen above 0, a different set of equations may be used to calculate the new exposure level. It may be possible to calculate a target intensity value using the hi_target_prc parameter.

It may then be determined that the intensity value error exceeds a dark speedup threshold $s_d$. This corresponds to a dark speedup intensity status 61. $s_d$ may be positive. The new exposure level may be calculated as follows:

$$W = \frac{\Delta A(t_i) - s_d}{s_d}(f_d - 256) + 256 \tag{6}$$

$$Err_P(t_i) = \frac{W \log_2(\Delta A(t_i))}{256} \tag{7}$$

$$Err_I(t_i) = I(t_i) + Err_P(t_i) \tag{8}$$

where $f_d$ is a parameter. Alternatively, a predefined value for W may be used in equation (7). Alternatively, the value calculated from equation (6) may be compared with an upper threshold and a lower threshold; if it is greater than the upper threshold then the upper threshold value is used; if it is less than the lower threshold then the lower threshold value may be used; and if it is between the two threshold values then the value calculated from equation (6) may be used in equation (7). Equation (5) may then be used to determine the new exposure level. The upper threshold may be $f_d$. The lower threshold may be 256. The number 256 is used throughout this description to represent the number 1 in a fixed point format, and may be replaced throughout with any number appropriately. The dark speedup intensity status 61 may apply whenever the intensity value error exceeds $s_d$.

The exposure level 11 may then approach an approximately constant value. This is known as exposure convergence. Since the new exposure level is calculated based on the difference between a target intensity value and a current average intensity value, the exposure level 11 may converge. The pre-tonemapping histogram mean also may converge to an approximately constant value.

At around frame 100, the pre-tonemapping histogram spikes, reaching a local maximum value, and then returns to its previous value. This may be at least in part due to a change in the scene captured by the image sensor 10. The scene captured by the image sensor may be brighter than prior to frame 100.

The clipping threshold may not be exceeded at frame 100 by the pre-tonemapped intensity values. However, when a tonemapping digital gain is applied to the pre-tonemapped intensity values prior to applying the tonemapping function, the clipping threshold may be exceeded. This corresponds to a gain clipping intensity status 62. The tonemapping digital gain may be reduced in this case. The exposure level 11 may be reduced more quickly than in a standard intensity status 63. Additionally, or alternatively, an overall digital gain may be split between the tonemapping digital gain (applied after the pre-tonemapping histogram is obtained) and the pre-processing digital gain (applied prior to the pre-tonemapping histogram). The tonemapping digital gain may be three times greater than the pre-processing digital gain when possible. However, the tonemapping digital gain may be related by a different relation to the pre-processing digital gain, depending on the application in which the image sensor 10 is used. When one of the tonemapping digital gain and the pre-processing digital gain has a maximum value, any further increases in gain may be allocated to the other.

After the pre-tonemapping histogram mean has returned to an approximately constant value around frame 120, the image may not be over-exposed or under-exposed, corresponding to the standard intensity status 63. In this intensity status, a new exposure level may be calculated using the following equations with equation (5):

$$Err_p(t_i) = \log_2(\Delta A(t_i)) \tag{9}$$

$$Err_I(t_i) = I(t_i) + Err_p(t_i) \tag{10}$$

Around frame 200, the pre-tonemapping histogram mean rises to a maximum value, corresponding to a total maximum clipping intensity status 64. All of the intensity values may have a maximum value. The maximum value may be the clipping threshold. For example, a vehicle on which the image sensor 10 is mounted may suddenly exit a tunnel during the daytime. In such a case, since prior to frame 200 the exposure level 11 is around a level suitable for a tunnel, the exposure level 11 may be too high for an outdoor setting. Hence, all of the intensity values may reach the clipping threshold.

As with the total minimum clipping intensity status 60, a target intensity value and intensity value error may not be appropriate for calculating a new exposure level. In the total maximum clipping operation condition, the new exposure level may be calculated by using the following equations in conjunction with equation (5).

$$Err_p(t_i) = \log_2(b) \tag{11}$$

$$Err_I(t_i) = I(t_i) - c \times Err_p(t_i) \tag{12}$$

Similarly to the total minimum clipping intensity status 60, the new exposure level may be less than the previous exposure level, but the new exposure level may still be too high. As can be seen in FIG. 6, the pre-tonemapping histogram mean remains at the maximum value for several frames.

Once the pre-tonemapping histogram mean has decreased below the maximum value, it may be possible to calculate a target intensity value. A bright speedup intensity status 65 may begin to apply. If it is determined that the intensity value error is negative and lower (greater in magnitude) than a bright speedup threshold $s_b$, the following equations may be applied with equation (5) to determine the new exposure level.

$$W = \frac{\Delta A(t_i) - s_b}{s_b}(f_b - 256) + 256 \tag{13}$$

$$Err_P(t_i) = \frac{W \log_2(\Delta A(t_i))}{256} \tag{14}$$

$$Err_I(t_i) = I(t_i) - Err_P(t_i) \tag{15}$$

where $f_b$ is a parameter that may be the same as $f_d$. Alternatively, a predefined value for W may be used, or the value of W may be clamped between an upper and a lower threshold as described with reference to equations (6) and (7).

The intensity statuses described above, together with the oscillation intensity status which will be described with reference to FIG. 7, form an exposure partitioning scheme, where the exposure convergence mode is determined from the pre-tonemapping histogram. The intensity status may be determined by verifying whether each of the criteria for each intensity status are met in a predefined order, using the equations for a given intensity status to determine the new exposure level when it is found that the given intensity status applies, and ceasing to check whether any of the remaining intensity statuses apply. An example of such an order is as follows: total maximum clipping 64, total minimum clipping 60, oscillation, gain clipping 62, dark speedup 61, bright speedup 65. If none of these intensity statuses apply, it may be assumed that the standard intensity status 63 applies. Determining the intensity status using this order may improve the speed of convergence and/or the computational efficiency of the determination of the new exposure level.

Figure 7:
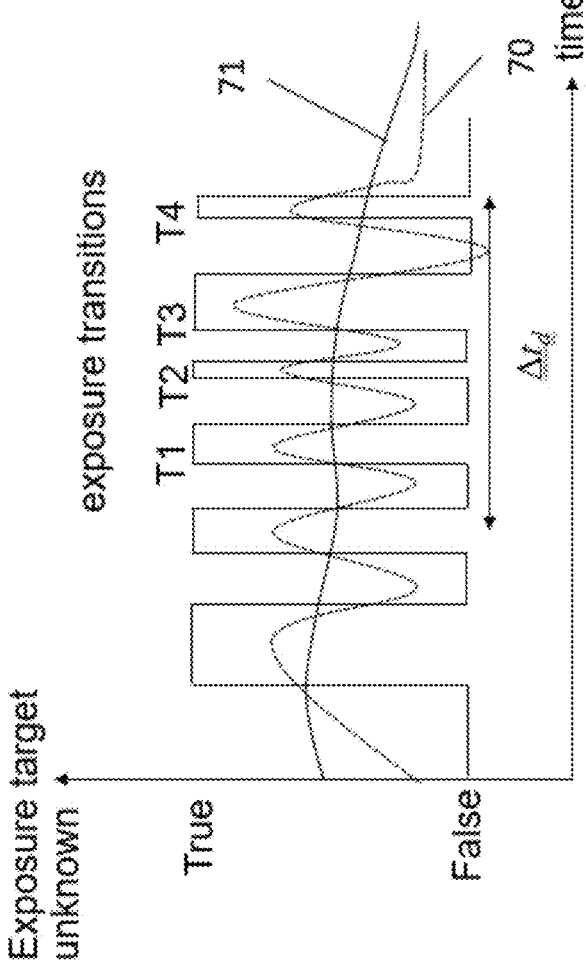
FIG. 7 is a graph of an exposure level, average exposure level and exposure transitions of an image sensor against time.

FIG. 7 shows an example graph of an exposure level 11, average exposure level 71 and exposure transitions of the image sensor 10 against time. The exposure level 11 may oscillate due to the presence of an oscillating light source in the scene, such as flashing lights of emergency vehicles, flickering light sources, or on-coming vehicles. The exposure level 11 may alternatively oscillate due to a regularly spaced set of light sources, for example streetlights or the sun shining through trees, which are passed in succession by a vehicle to which the image sensor 10 is mounted.

It may be desirable to reduce the effect of oscillating light sources on the intensity of the result image 16. If the exposure level 11 is configured to adjust very quickly in response to changes in the pre-tonemapping histogram, then oscillating light sources may cause the exposure level 11 to oscillate. While this may be useful for reducing the number of clipped pixels or maintaining an approximately constant average intensity value of the result image 16, it may cause objects in the image other than the oscillating light source (whose true luminosities have not changed) to appear to oscillate in their brightness. This may hinder the object detection algorithm 17 from detecting these objects. According to some embodiments, the exposure convergence rate may be reduced when an oscillation is detected. Furthermore, the tonemapping strength may be modified in order to reduce oscillations in the brightnesses of objects in the result image 16.

For each image, it may be determined, according to the method described in reference to FIG. 2, whether the exposure level target is known or not (as represented by the Boolean variable "exposure level target unknown"). If the number of clipped intensity values is below the maximum acceptable percentage, then the exposure level target may be known, and if it is not, then the exposure level target may be unknown. A transition may be defined as a change from the exposure level target being known to the exposure level target being unknown. Example transitions occur at times T1, T2, T3 and T4 as shown on FIG. 7. The number of transitions n occurring during a detection window may be determined. The detection window may comprise a time interval of a predetermined duration $\Delta t_d$ ending at the current frame. The number of transitions may be used to calculate a hysteresis weight, which may be used to determine an exposure convergence rate and/or a tonemapping strength.

An instantaneous hysteresis weight H' may first be calculated as follows:

$$H' = 256 - h \times \frac{n}{\Delta t_d} \tag{16}$$

where h is a parameter. The instantaneous hysteresis weight may be lower if there is a larger number of transitions n. The instantaneous hysteresis weight may be used with the hysteresis weight calculated for the previous frame $H_{i-1}$ to determine the new hysteresis weight $H_i$, for example according to the following equation:

$$H_i = (1-\delta)H' + \delta \times H_{i-1} \tag{17}$$

where δ is a parameter. This may allow the hysteresis weight to gradually accumulate if transitions begin to be detected or decay if transitions are no longer detected.

If n is greater than 0, then an oscillation intensity status may apply. In this intensity status, the exposure level 11 may be adjusted by using the following equations with equation (5):

$$Err_P(t_i) = \frac{H_i}{256} \log_2(\Delta A(t_i)) \tag{18}$$

$$Err_I(t_i) = I(t_i) + Err_P(t_i) \tag{19}$$

The magnitude of the difference between the new exposure level $E_{i+1}$ and the current exposure level $E_i$ may be lower if the number of transitions is higher. This may reduce oscillations in the intensity values representing objects other than oscillating light sources in the result image 16.

However, even with the above modification to the exposure convergence rate, in the presence of an oscillating light source, the exposure level 11 typically oscillates. It is hence desirable to further mitigate the effects of the oscillation on the result image 16. This may be achieved by modifying the tonemapping strength of the tonemapper when an oscillation is detected.

Figure 8:
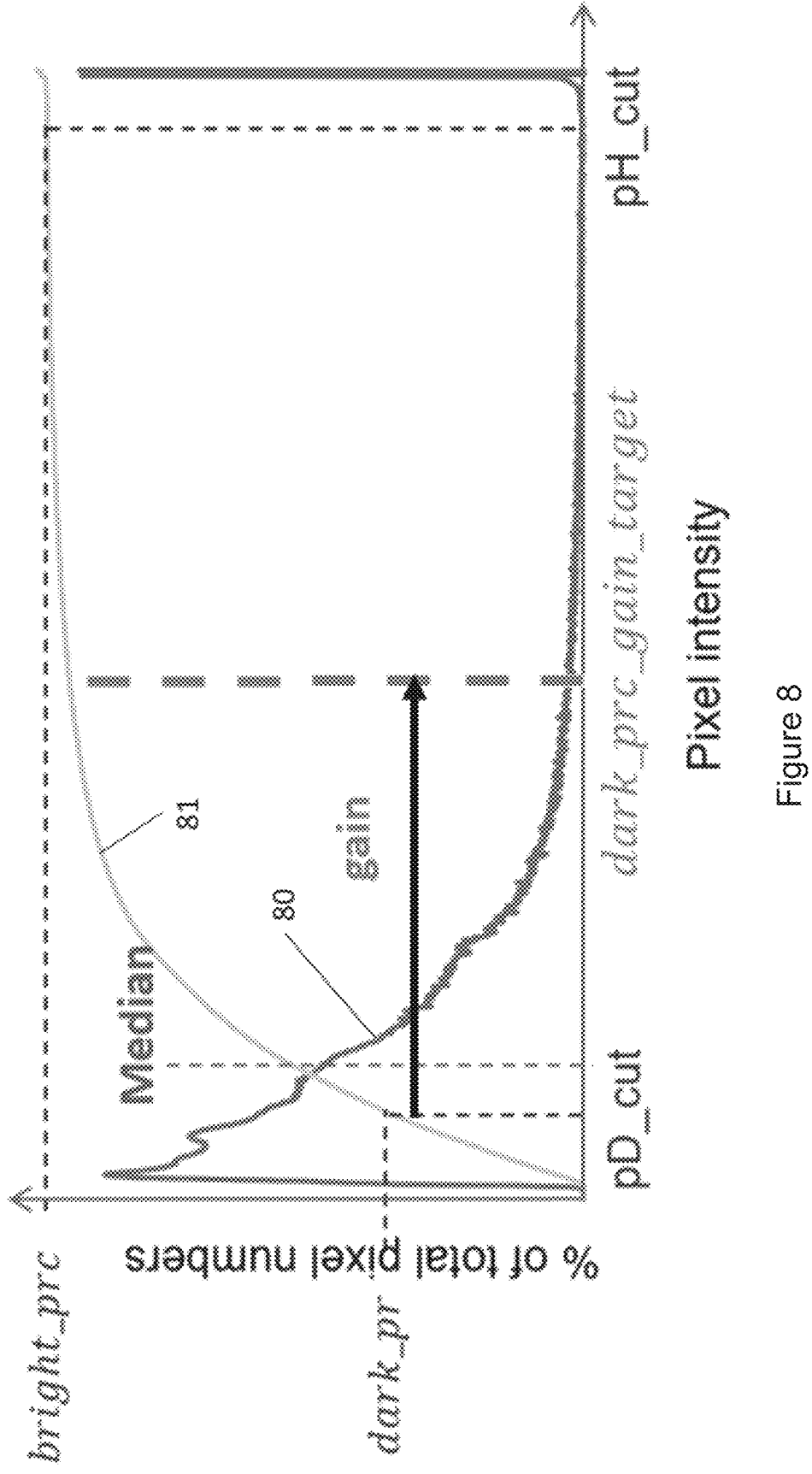
FIG. 8 is a histogram of pre-tonemapped intensity values.

FIG. 8 is a diagram showing an example method for determining a pre-compensation tonemapping strength. FIG. 8 shows an example pre-tonemapping histogram 80 and cumulative histogram 81. The pre-tonemapping histogram may represent the pre-tonemapped intensity values of a previous image, for example image i−1. Using the pre-tonemapped intensity values of the current image to determine a tonemapping strength of a tonemapping function to be applied to the pre-tonemapped intensity values of the current image may lead to a lag between the current image being captured and the result image 16 being outputted, and as a consequence it may be preferable to use the pre-tonemapped intensity values of a previous image to calculate the tonemapping strength. The tonemapping strength for the current image may be calculated prior to receiving pre-tonemapped intensity values of the current image.

A parameter dark_pr may be used to determine an intensity value pD_cut below which a first predefined number of intensity values lie. A tonemapping gain ratio may be defined as a set intensity dark_prc_gain_target divided by pD_cut. A preliminary tonemapping strength may then be defined as the tonemapping gain ratio divided by a maximum allowable gain ratio. A further preliminary tonemapping strength may then be determined by comparing the preliminary tonemapping strength with a maximum strength and a minimum strength; if the preliminary tonemapping strength is greater than the maximum strength then the maximum strength is used for the further preliminary tonemapping strength; if it is less than the minimum strength then the minimum strength is used; and if it is between the maximum strength and the minimum strength then the preliminary tonemapping strength is used.

The minimum strength is typically a fixed parameter. The maximum strength, however, is typically calculated based on at least one of an image contrast, a median pre-tonemapped intensity value, and the current exposure level $E_i$. Since the current exposure level may be determined during processing of the previous image, for example using the method described with reference to FIG. 3, even though it may be preferable to use the pre-tonemapped intensity values of a previous image, the tonemapping strength may be calculated using the current exposure level. In this way, the use of the current exposure level may effectively act as a foresight of a correction that may be applied to the tonemapping strength, without knowledge of the current pre-tonemapped intensity values.

Figures 9A, 9B:
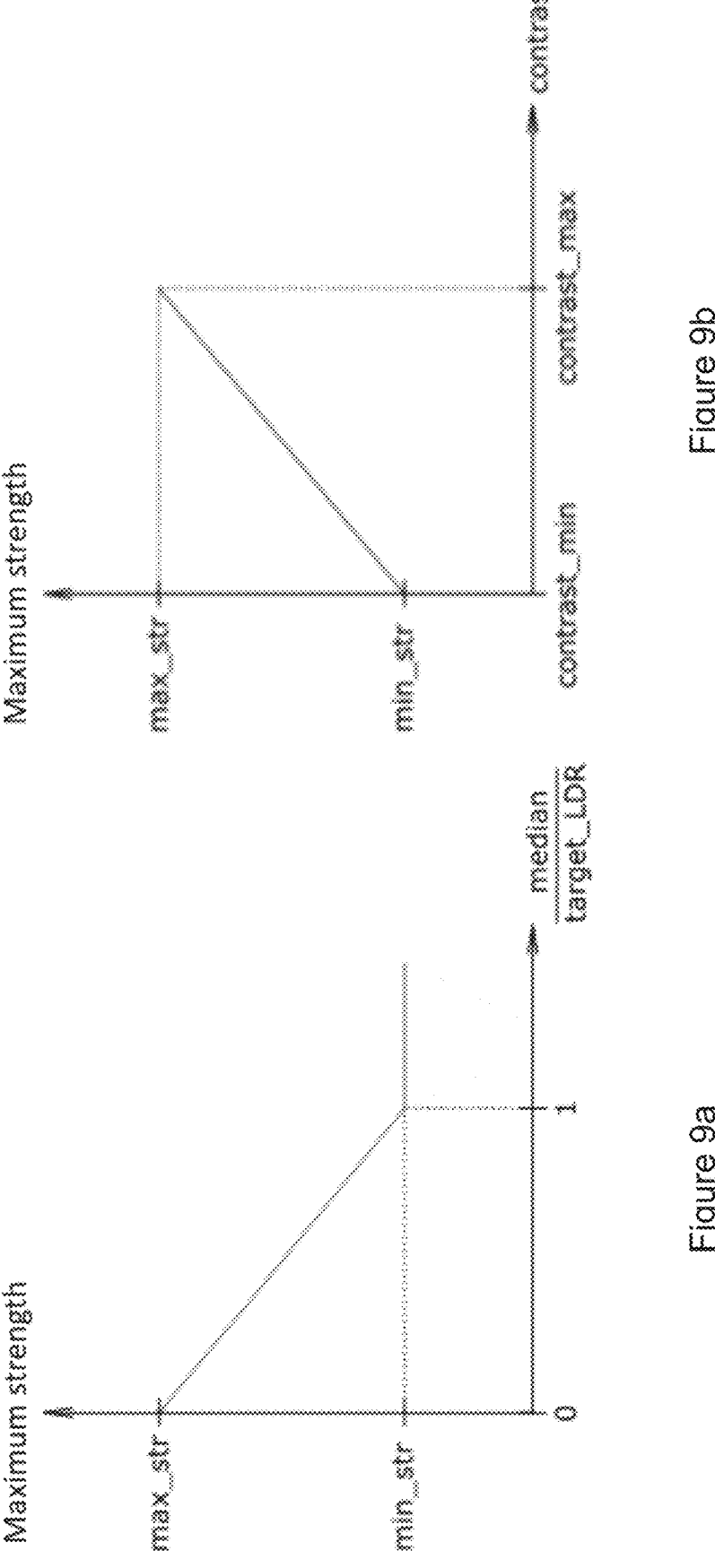
FIG. 9a is a graph of a maximum tonemapping strength against median pre-tonemapped intensity value.
FIG. 9b is a graph of a maximum tonemapping strength against image contrast.

FIGS. 9a and 9b show graphs of a maximum strength against a median pre-tonemapped intensity value and an image contrast respectively. The image contrast may first be calculated. A parameter bright_prc may be used to determine an intensity value pH_cut below which a first predefined number of intensity values lie. The image contrast may be calculated as pH_cut divided by pD_cut.

The tonemapping function may comprise a set of three functions. Each function may use the tonemapping strength as a parameter. The first function may be applied to pre-tonemapped intensity values below pD_cut. The second function may be applied to pre-tonemapped intensity values between pD_cut and pH_cut. The second function may comprise histogram equalisation. The third function may be applied to pre-tonemapped intensity values above pH_cut.

If the image contrast is greater than a parameter contrast_max, then a parameter max_str may be used for the maximum strength.

If the image contrast is less than a parameter contrast_min, then the median pre-tonemapped intensity value of the pre-tonemapped intensity values may be used to determine the maximum strength. Alternatively, the median pre-tonemapped intensity value divided by target_LDR may be used to determine the maximum strength. If the median pre-tonemapped intensity value is below a parameter pd_cut_min, then the maximum strength may be max_str. pd_cut_min may be 0. If the median pre-tonemapped intensity value is greater than or equal to target_LDR, the maximum strength may take a value min_str, which is less than max_str. If the median pre-tonemapped intensity value is between 0 and target_LDR, the maximum strength may take a linearly interpolated value between max_str and min_str.

If the image contrast is between contrast_min and contrast_max, and the median pre-tonemapped intensity value is less than a parameter target_point, then the maximum strength may be calculated in the same way as if the image contrast is less than contrast_min. target_point may be equal to target_LDR.

If the image contrast is between contrast_min and contrast_max, and the median pre-tonemapped intensity value is greater than target_point, then the maximum strength may be calculated according to FIG. 9b. In this case, if the image contrast is equal to contrast_min, the maximum strength may be min_str. If the image contrast is equal to contrast_max, the maximum strength may be max_str. If the image contrast is between contrast_min and contrast_max, the maximum strength may take a linearly interpolated value between min_str and max_str.

A further preliminary tonemapping strength may then be determined on the basis of the preliminary tonemapping strength, the maximum strength, and/or the minimum strength. An instantaneous tonemapping strength may then be calculated on the basis of the further preliminary tonemapping strength and the current exposure level $E_i$. If the current exposure level is less than a parameter ev_full_str, then the instantaneous tonemapping strength may be equal to the further preliminary tonemapping strength. If the current exposure level is greater than a parameter ev_no_str, the instantaneous tonemapping strength may be equal to 0. If the exposure level 11 is between ev_full_str and ev_no_str, the instantaneous tonemapping strength may take a linearly interpolated value between the further preliminary tonemapping strength and 0.

A pre-compensation tonemapping strength is a measure of the tonemapping strength which takes account of the pre-tonemapped intensity values and optionally an average tonemapping strength. The average tonemapping strength may be an average of the tonemapping strengths of the tonemapping functions applied to each of a plurality of images captured by the image sensor 10 between the image sensor 10 being turned on and the image i−1 captured immediately prior to the current image. Alternatively, the average tonemapping strength may be an average of the tonemapping strengths of the tonemapping functions applied to each of a predetermined number of the most recently captured images captured by the image sensor 10. For example, the average tonemapping strength may be an average of the tonemapping strengths of the tonemapping functions applied to each of the images captured during the detection window apart from the current image. The pre-compensation tonemapping strength may be calculated as follows:

$$T_p = \frac{T'}{a} - \frac{T_a}{a^2} \tag{20}$$

where $T_p$ is the pre-compensation tonemapping strength, T' is the instantaneous tonemapping strength, $T_a$ is the average tonemapping strength, and a is a parameter.

The above methods, or variations thereof, may also be used to calculate a dark enhancement parameter, hereinafter referred to as dark enhancement. The dark enhancement may be an additional parameter of the tonemapping function which may be used to determine an amount of brightening applied to dark pixels. In some embodiments, in contrast to the tonemapping strength, dark enhancement may only be applied to pre-tonemapped intensity values which are below a particular value, such as pD_cut.

In the case of calculating dark enhancement, a first preliminary dark enhancement may be calculated using FIG. 9a, and a second preliminary dark enhancement may be calculated using FIG. 9b, where max_str and min_str are replaced with max_dk and min_dk, which are a predefined first and a predefined second dark enhancement respectively. A third preliminary dark enhancement may be calculated by taking the lower of the first and second preliminary dark enhancements. A fourth preliminary dark enhancement may be calculated from the third preliminary dark enhancement and an average dark enhancement (which may be determined in a similar fashion to the average tonemapping strength) as follows:

$$D_4 = D_a(1 - \frac{1}{a}) + D_3 \tag{21}$$

where $D_4$ is the fourth preliminary dark enhancement, $D_a$ is the average dark enhancement, and $D_3$ is the third preliminary dark enhancement.

Similarly to the tonemapping strength, the dark enhancement may depend on the current exposure level. If the current exposure level is less than a parameter ev_full_str, then a fifth preliminary dark enhancement may be equal to the fourth preliminary dark enhancement divided by a. If the current exposure level is greater than a parameter ev_no_str, the fifth preliminary dark enhancement may be equal to 0. If the current exposure level is between ev_full_str and ev_no_str, the fifth preliminary dark enhancement may take a linearly interpolated value between the fourth preliminary dark enhancement divided by a and 0.

The dark enhancement may be determined by taking the lower of the fourth preliminary dark enhancement and the fifth preliminary dark enhancement.

As previously mentioned, it is desirable to further mitigate the effects of an oscillating light source by modifying the tonemapping strength when an oscillation is detected. According to some embodiments, the pre-compensated tonemapping strength may be modified using a compensating factor to obtain the tonemapping strength.

Referring to FIG. 7, an average exposure level 71 may be calculated from instantaneous exposure level values. The average exposure level 71 may be a weighted average exposure level. Firstly, an instantaneous average exposure level may be calculated by dividing the sum of the instantaneous exposure level values of the frames in the detection window by the number of frames or by the predetermined duration $\Delta t_d$. The weighted average exposure level may be calculated using the instantaneous average exposure level and a previous weighted average exposure level calculated for the preceding frame, for example according to the following formula:

$$\hat{E}_i = h\hat{E}^i + (g-h)\hat{E}_{i-1} \tag{22}$$

where g is a parameter. An exposure level difference may be calculated by subtracting the exposure level of the current frame from the average exposure level 71 as follows:

$$\Delta E_i = \hat{E}_i - E_i \tag{23}$$

The tonemapped intensity values of one or more previous frames may also be used to calculate the compensating factor. Specifically, a median tonemapped intensity value of the preceding frame $R_{i-1}$ may be used. This intensity value will hereinafter be referred to as the median tonemapped intensity value.

An average median tonemapped intensity value may be calculated from the median tonemapped intensity values of the frames in the detection window in a similar fashion to the average exposure level 71.

A post-tonemapping difference $\Delta R_i$ may be calculated using the tonemapped median intensity value of the preceding frame $R_{i-1}$ and the average median tonemapped intensity value. The post-tonemapping difference may further be calculated based on the hysteresis weight. The post-tonemapping difference may be calculated according to the following equation:

$$\Delta R_i = \left(\overline{R}_i - R_{i-1}\right)\frac{255 - H}{n} \tag{24}$$

The post-tonemapping difference may be used to calculate an accumulated post-tonemapping difference for the current frame $C_i$ according to the following formula.

$$C_i = C_{i-1} + \Delta R_i \tag{25}$$

The accumulated post-tonemapping difference $C_i$ may be reset to 0 if the hysteresis weight is equal to 255. The hysteresis weight being equal to 255 may indicate that no oscillations are detected.

The tonemapping strength for the current frame $T_1$ may be calculated based on the pre-compensation tonemapping strength $T_p$ and the compensating factor r as follows.

$$r = 2^{(255-H)C_i \Delta E_i} \tag{26}$$

$$T_i = rT_p \tag{27}$$

The tonemapping strength may thus depend on the exposure level difference. For example, if the exposure level difference is positive, then the current exposure level is lower than the average exposure level 71. This may indicate that the current image is under-exposed, and hence darker than an average image taken during the detection window. In such a case, it may be appropriate to apply more tonemapping to the image than to an average image, so that any excessively dark regions appear brighter in the result image 16. To this end, the compensating factor may increase exponentially with the exposure level difference.

The tonemapping strength may also depend on the accumulated post-tonemapping difference. For example, if the accumulated post-tonemapping difference is initially 0 and the post-tonemapping difference becomes positive (leading to the accumulated post-tonemapping difference becoming positive), then the tonemapped median intensity value of the preceding frame is lower than the average median tonemapped intensity value. This may indicate that the preceding image is darker than an average image taken during the detection window. In such a case, it may be appropriate to apply more tonemapping to the current image than to an average image, so that any excessively dark regions appear brighter in the result image 16. To this end, the compensating factor may increase exponentially with the accumulated post-tonemapping difference. This may bring the tonemapped median intensity value closer to the average median tonemapped intensity value, and may have a damping effect on oscillations in the median tonemapped intensity values of successive result images. Computing the compensating factor in a closed-loop fashion may enable further mitigation of the oscillations. This may be achieved by the use of an accumulated post-tonemapping difference.

The exposure level gain between the preceding frame and the current frame may also be used as a further variable in calculating the tonemapped intensity values. In order to determine the pre-compensated tonemapping strength, the pre-tonemapped intensity values of the previous image may be used, as described previously. However, since the exposure level 11 of the image sensor 10 changes from the previous exposure level $E_{i-1}$ to the current exposure level $E_i$, it may be appropriate to modify the pre-tonemapped intensity values of the previous image using the exposure level gain $E_i/E_{i-1}$, for example by multiplying the pre-tonemapped intensity values by the exposure level gain or a predetermined function of the exposure level gain, prior to using them to determine the tonemapping strength.

However, when the exposure level gain is high and the current exposure level is low (i.e. there are lots of dark intensity values), overshooting and/or flashing in the result image 16 may be observed. Hence, it may be useful to instead apply a corrected exposure level gain in order to mitigate the overshooting or flashing described above.

The corrected exposure level gain may be calculated as follows:

$$\left(\frac{E_i}{E_{i-1}}\right)' = 256 + \left(\frac{E_i}{E_{i-1}} - 256\right)\frac{m}{m_0} \tag{28}$$

where m is the average pre-tonemapped intensity value of the previous frame i−1 and $m_0$ is a parameter. m may be a median pre-tonemapped intensity value. The corrected exposure level gain may instead be set to the exposure level gain if $m=m_0$.

The above embodiments are to be understood as illustrative examples of the invention. Further embodiments of the invention are envisaged. For example, the parameters used to calculate the new exposure level and tonemapping strength may be altered depending on the application (for example, driving in one location where it is typically very sunny with little cloud, or in another location where it is typically cloudy).

Any of the software components or functions described in this application may be implemented as software code to be executed by a processor using any suitable computer language such as, for example, Java, C, C++,C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:
1. A method for adjusting an exposure level of an image sensor, comprising:
   receiving current intensity values of a current image captured by the image sensor, the image sensor having an initial exposure level when the current image is captured;
   determining an intensity status based on comparing at least one characteristic of at least the current intensity values to one or more criteria, wherein determining the intensity status comprises:
      comparing each of the current intensity values to a criterion; and
      comparing a characteristic of the current intensity values satisfying the criterion to a maximum clipping criterion;
   selecting an exposure convergence mode, from a plurality of exposure convergence modes, based on the intensity status, wherein selecting the exposure convergence mode comprises, in response to determining that the maximum clipping criterion is satisfied, selecting, as a target intensity value, an anti-flicker target intensity value used for an anti-flicker image captured by the image sensor prior to the current image; and
   calculating, based on the current intensity values and the target intensity value, a new exposure level for use by the image sensor in capturing a subsequent image.
2. The method of claim 1,
   wherein if the maximum clipping criterion is not satisfied, the method comprises:

calculating a gain value, wherein applying the gain value to the current intensity values causes the maximum clipping criterion to be satisfied; and
   calculating, based on the gain value, the target intensity value.
3. The method of claim 1, wherein the method comprises receiving intensity values of at least one image captured by the image sensor during a detection window, and determining the intensity status comprises:
   identifying, using the intensity values of the current image and the at least one image captured during the detection window, one or more transitions occurring during the detection window, the one or more transitions each comprising a transition between an image in which the maximum clipping criterion is not satisfied and an image in which the maximum clipping criterion is satisfied; and
   based on the identified transitions, determining that the intensity status is an oscillation status.
4. The method of claim 1, comprising:
   calculating an average intensity value of the current intensity values; and
   calculating, based on the average intensity value and the target intensity value, an intensity value error,
   wherein calculating the new exposure level comprises calculating the new exposure level based on the intensity value error and the exposure convergence mode.
5. The method of claim 4, wherein determining the intensity status comprises:
   comparing the intensity value error to a speed-up threshold, wherein
   if the intensity value error is lower than the speed-up threshold, determining the intensity status comprises determining that the intensity status is a standard operating status and selecting the exposure convergence mode comprises selecting a first exposure convergence mode, and
   if the intensity value error is greater than the speed-up threshold, determining the intensity status comprises determining that the intensity status is a speed-up status and selecting the exposure convergence mode comprises selecting a second exposure convergence mode,
   wherein the second exposure convergence mode corresponds to a faster exposure convergence rate than the first exposure convergence mode.
6. The method of claim 3, comprising:
   calculating an average intensity value of the current intensity values; and
   calculating, based on the average intensity value and the target intensity value, an intensity value error,
   wherein calculating the new exposure level comprises calculating the new exposure level based on the intensity value error and the exposure convergence mode,
   wherein determining the intensity status comprises:
   comparing the intensity value error to a speed-up threshold, wherein
   if the intensity value error is lower than the speed-up threshold, determining the intensity status comprises determining that the intensity status is a standard operating status and selecting the exposure convergence mode comprises selecting a first exposure convergence mode, and
   if the intensity value error is greater than the speed-up threshold, determining the intensity status comprises determining that the intensity status is a speed-up status and selecting the exposure convergence mode comprises selecting a second exposure convergence mode, wherein the second exposure convergence mode corresponds to a faster exposure convergence rate than the first exposure convergence mode, and wherein comparing the intensity value error to the speedup threshold is performed in response to determining that there are no transitions occurring during the detection window.

7. The method of claim 4, comprising:

for each prior image of at least one prior image captured by the sensor prior to the current image, calculating a prior intensity value error, wherein calculating the new exposure level comprises calculating the new exposure level further based on a sum of the prior intensity value errors.

8. The method of claim 4, wherein determining the intensity status comprises comparing the average intensity value to a bright image criterion and/or a dark image criterion.

9. The method of claim 1, comprising:

calculating an image contrast based on the current intensity values; and comparing the image contrast to a dynamic range threshold, wherein if the image contrast is lower than the dynamic range threshold, the target intensity value has a predefined value.

10. The method of claim 1, wherein:

the initial exposure level comprises an initial gain factor and an initial integration interval, the sensor captures pixel values by measuring an amount of light reaching the sensor during the initial integration interval, the initial gain factor is applied to the pixel values to obtain the current intensity values, and calculating the new exposure level comprises determining a new gain factor and a new integration interval, wherein the new gain factor and the new integration interval are related by a predefined relation.

11. The method of claim 1, comprising:

receiving intensity values of the subsequent image, the image sensor having the new exposure level when the subsequent image is captured; and detecting at least one physical object represented by the subsequent image.

12. A non-transitory computer-readable storage medium comprising instructions which, when executed by a computer, cause the computer to perform a method for adjusting an exposure level of an image sensor, the method comprising:

receiving current intensity values of a current image captured by the image sensor, the image sensor having an initial exposure level when the current image is captured;

determining an intensity status based on comparing at least one characteristic of at least the current intensity values to one or more criteria, wherein determining the intensity status comprises:

comparing each of the current intensity values to a criterion; and comparing a characteristic of the current intensity values satisfying the criterion to a maximum clipping criterion;

selecting an exposure convergence mode, from a plurality of exposure convergence modes, based on the intensity status, wherein selecting the exposure convergence mode comprises, in response to determining that the maximum clipping criterion is satisfied, selecting, as a target intensity value, an anti-flicker target intensity value used for an anti-flicker image captured by the image sensor prior to the current image; and calculating, based on the current intensity values and the target intensity value, a new exposure level for use by the image sensor in capturing a subsequent image.

13. A system configured to perform a method for adjusting an exposure level of an image sensor, the method comprising:

receiving current intensity values of a current image captured by the image sensor, the image sensor having an initial exposure level when the current image is captured;

determining an intensity status based on comparing at least one characteristic of at least the current intensity values to one or more criteria, wherein determining the intensity status comprises:

comparing each of the current intensity values to a criterion; and comparing a characteristic of the current intensity values satisfying the criterion to a maximum clipping criterion;

selecting an exposure convergence mode, from a plurality of exposure convergence modes, based on the intensity status, wherein selecting the exposure convergence mode comprises, in response to determining that the maximum clipping criterion is satisfied, selecting, as a target intensity value, an anti-flicker target intensity value used for an anti-flicker image captured by the image sensor prior to the current image; and calculating, based on the current intensity values and the exposure convergence mode, a new exposure level for use by the image sensor in capturing a subsequent image.

* * * * *